May 16, 1939.  R. C. HOYT  2,158,700
BRAKE MECHANISM
Filed Jan. 8, 1936  2 Sheets-Sheet 1
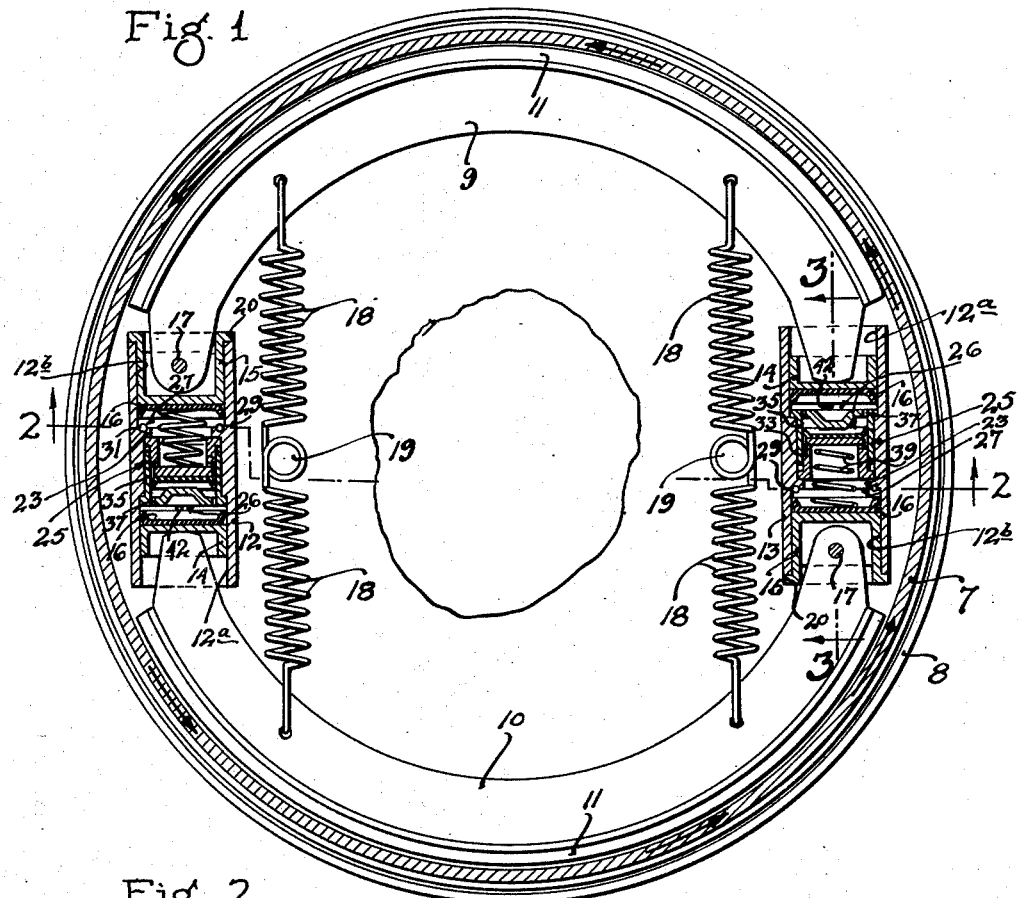
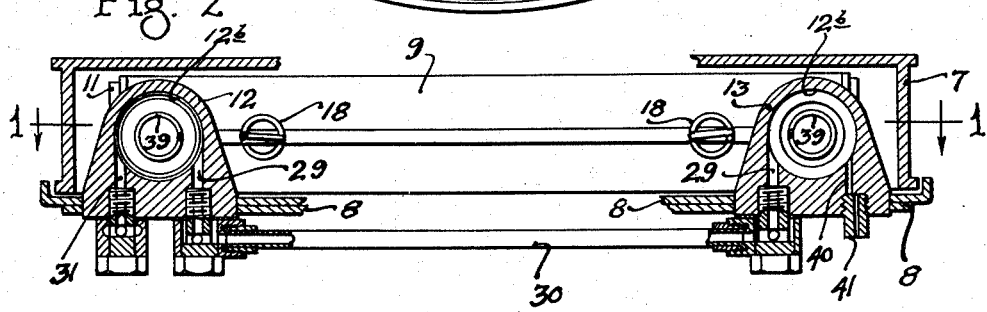
INVENTOR
R. C. HOYT
BY HIS ATTORNEYS
Merchant, Kilgore & Perry May 16, 1939.  R. C. HOYT  2,158,700
BRAKE MECHANISM
Filed Jan. 8, 1936   2 Sheets-Sheet 2
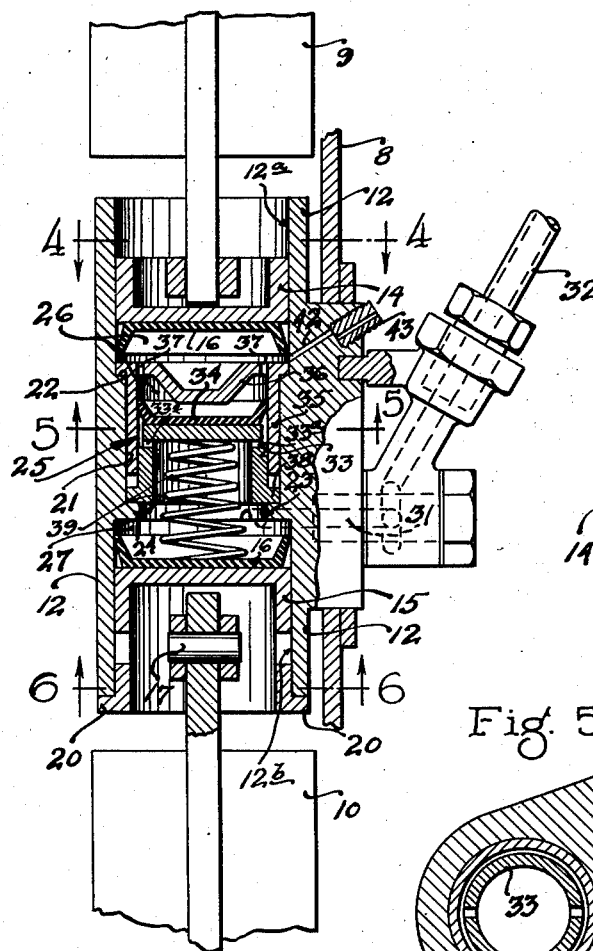
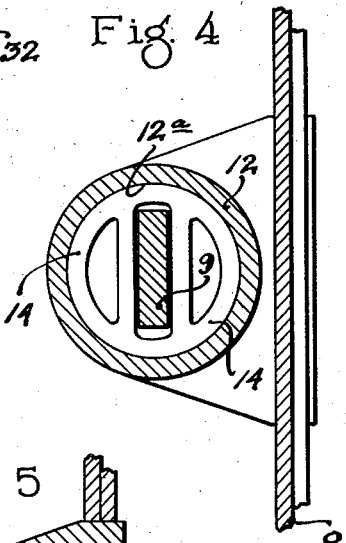
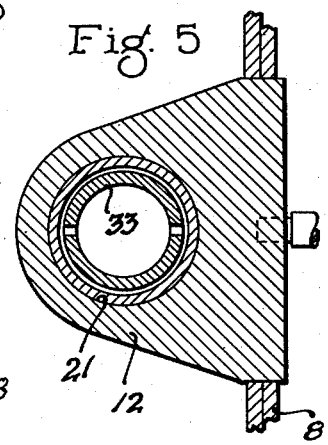
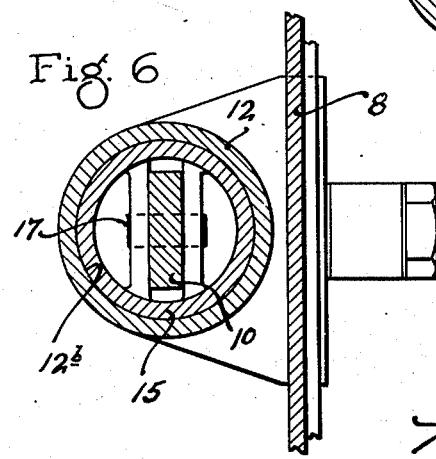
INVENTOR
R. C. HOYT
BY HIS ATTORNEYS Patented May 16, 1939

2,158,700

UNITED STATES PATENT OFFICE 2,158,700

BRAKE MECHANISM

Roy Corwin Hoyt, Duluth, Minn.

Application January 8, 1936, Serial No. 58,115

6 Claims. (Cl. 188—152)

My present invention relates to improvements in friction brake mechanisms of the general character employed in connection with automobiles and other motor-propelled vehicles, and is in the nature of a modification of or improvement on the invention disclosed and broadly claimed in my companion application filed by me of even date herewith, under Serial No. 58,114, and entitled "Brake mechanism". The present invention differs specifically from that of my companion application in various important features, all of which will be hereinafter fully disclosed in connection with a preferred form of the invention illustrated in the drawings, and which invention will be herein defined in the claims.

In the accompanying drawings, wherein like characters indicate like parts throughout the several views, the invention is illustrated in connection with a brake mechanism of the hydraulic pressure operated type.

Referring to the drawings:

Fig. 1 is a vertical sectional view taken approximately on the line 1—1 of Fig. 2;

Fig. 2 is an approximately axial sectional view taken on the irregular line 2—2 of Fig. 1;

Fig. 3 is an enlarged fragmentary detail view taken on the line 3—3 of Fig. 1;

Fig. 4 is an enlarged detail view taken on the horizontal line 4—4 of Fig. 3;

Fig. 5 is an enlarged detail view taken on the line 5—5 of Fig. 3 and looking upwardly; and Fig. 6 is a detail sectional view taken on the line 6—6 of Fig. 3.

A rotary brake drum of the usual character and which may be assumed to be mounted fast on a vehicle wheel, not shown, is indicated by 7, and a carrier plate, which serves to close the open side of the brake drum and as a mounting base for the parts of the brake mechanism, is indicated by 8. The carrier plate 8 may be assumed to be rigidly mounted in the usual manner to a fixed part of the vehicle structure such, for example, as a stationary part of an axle.

Disposed within the drum 7 is an opposed pair of like, non-rotary, segmental brake shoes indicated by 9 and 10, respectively. These brake shoes 9 and 10 are of the usual character and are provided with the customary facings 11, which facings, together with the inner surface of the brake drum, comprise the friction elements of a brake.

The mechanism for operating the brake shoes from hydraulic pressure includes fixed cylinders 12 and 13, the former being disposed between opposite left-hand ends, with respect to the drawings, of the shoes 9 and 10, and the latter being disposed between the opposed other or right-hand ends of the shoes 9 and 10. The cylinders 12 and 13, while alike, are rotatively positioned 180 degrees apart with respect to one another and are each provided with axially spaced, axially aligned end bores 12a and 12b. The bores 12a are each provided with a piston 14 and the cylinder bores 12b are each provided with a piston 15. Each of the pistons 14 and 15 is provided, at its closed inner end, with an inwardly flanged resilient fluid sealing cup 16 of well-known character and which cups may be assumed to be formed of rubber or suitable substitute material.

Herein the end of a brake shoe pointing in a direction opposite to the direction of drum rotation at any particular time is considered and referred to as the "toe" end of the brake shoe, and the end of a brake shoe facing in the direction of rotation is considered and referred to as the "heel" end of the shoe. Hence, if we consider that the direction of rotation of the brake drum under forward movement of the vehicle is counter-clockwise, in respect to the drawings, as indicated by arrows on Fig. 1, the right-hand end of the shoe 9 and the left-hand end of the shoe 10 will be the toe ends of the shoes and the right-hand end of shoe 10 and the left-hand end of shoe 9 will be the heel ends of the shoes.

In the following description of the brake mechanism, it will be assumed that the vehicle is moving in a forward direction with the brake drum or drums rotating in a counter-clockwise direction, and reference to toe and heel ends of the shoes will be based upon such assumed directions of rotation.

The heel end of each of the shoes 9 and 10 works in and is pivotally anchored to a piston 15 at 17 and the toe end of each of the shoes 9 and 10 works in and against the closed head end of a piston 14 and is free for lateral shifting movements in respect thereto. The shoes 9 and 10 are maintained under yielding tension to retract out of engagement with the drum 7 by means of like coiled tension springs 18 that are anchored, at their opposite ends, to opposite portions of the opposed shoes 9 and 10 and are preferably intermediately anchored to the carrying plate 8 by suitable anchor pins or the like at 19. Under the tension of springs 18, the heel ends of shoes 9 and 10 are normally maintained retracted to certain definite positions determined by engagement of flanged ends 20 of the pistons 14 with the ends of their respective cylinders.

Maximum retraction of the toe ends of the shoes 9 and 10, however, is controlled by automatically adjusted mechanism, hereinafter to be described, and is limited to indefinite positions wherein the friction surfaces of the toe ends of the shoes are a predetermined definite distance from the drum. It will be noted by reference to the drawings that the cup-equipped ends of pistons 14 and 15 are, when the shoes are in their maximum retracted positions, spaced from the inner ends of their respective bores 12a or 12b.

The cylinders 12 and 13 are provided, inwardly of the piston-receiving bores 12a, with reduced diameter bores 21, that afford shoulders 22 therebetween and the bores 12a. These reduced diameter bores 21 connect to the piston-receiving bores 12a with the piston-receiving bores 12b through further reduced bores 23 that afford stop flanges 24.

Interposed in the reduced diameter intermediate bores 21 of the cylinders 12 and 13 are like fluid release flow measuring and check valve mechanisms, indicated as entireties by 25, and which valve mechanisms divide the insides of the cylinders into axially spaced fluid expansion chambers, the expansion chambers communicating with the cup-equipped pistons 14 being indicated by 26, and the expansion chambers communicating with the cup-equipped pistons 15 being indicated by 27. The expansion chambers 26 and 27 are connected to a common source of fluid pressure not shown. Such connection of the chambers 26 and 27 to a suitable source of fluid pressure includes passages 29 in cylinders 12 and 13 communicating directly with expansion chambers 27, a conduit 30 connecting the passages 29 of opposite cylinders, a passage 31 in cylinder 12 also communicating with its chamber 27, and conduit 32 leading from passage 31 to the pressure source. The chambers 26 are connected to the master cylinder through the medium of the valve mechanisms 25 and chambers 27 in a manner hereinafter made clear.

The valve mechanisms 25 each include an axially floating piston-like valve member 33 that is provided at one end with a head that serves as a base of reaction for a resilient fluid sealing cup 34 of the character used in connection with the pistons 14 and 15. These valve bodies 33 are provided in the cylindrical walls just under their heads with ports 33a. The resilient cups 34 are flanged in the direction of expansion chambers 26 and serve as one-way valves which permit free flow of fluid there-past to the expansion chambers 26 and to positively stop reverse flow there-past in the direction of the expansion chambers 27. The floating valve members 33 work slidably in fixed guide sleeves 35 that are press fit in the reduced diameter bores 21 and are provided with radial shoulders at their outer ends which engage stop shoulders 22.

For the purpose of illustration, heads of the valve bodies 33 have been shown as being reduced quite materially outward of the ports 33a, to show a free path for flow of fluid from chambers 27 to chambers 26 by way of ports 33a and the valve cups 34, but in practice such material reduction in diameter of the valve heads is neither necessary nor desirable. In fact, the maximum volume of fluid which must be moved past the valve cups 34 at any one time under operating conditions is so very small that ordinary working clearance between the heads of the valve body and their respective cylindrical bores will usually suffice, and approximately this condition is desirable as a safeguard against distortion or displacement of portions of the cups 34 under extreme pressures.

The fixed sleeves 35 are formed, at their ends, adjacent the expansion chamber 26, with perforated concave heads 36, which heads by virtue of their perforations, indicated by 37, serve only as stops for the valve cups 34 and do not interfere with flow of fluid within their respective chambers 26. These fixed sleeves 35, it will be further noted, are of less length than the bores 21 and the inner ends thereof serve as annular stop shoulders for outwardly flanged inner ends 38 of the floating valve bodies 33. Thus it will be seen that the valve bodies 33 will be permitted to move axially to the maximum extent permitted by engagement of the flanges 38 thereof with the inner ends of fixed sleeve 35 in one direction, and engagement of cylinder flanges 24 in the other direction. The cups 34 will engage the perforated heads 36 of the sleeves 35 in one extreme position and prevent movement of the cups away from the heads of their respective co-operating valve bodies.

For venting the system during fluid filling and draining operations, there is provided suitable vent apertures 40 that are normally closed by plugs 41, and vent apertures 42 that are normally closed by plugs 43. Obviously such other vent apertures and plugs as are deemed necessary may be provided.

Before going into the operation of the brake mechanism, it is desired that the following points be made clear, to wit:

1. In the drawings, the brake shoes and the various parts of the brake shoe operating mechanism are shown in their retracted or normal inoperative positions;

2. That, although no fluid is indicated in the drawings, it should be assumed that the expansion chambers 26 and 27 and the duct system are filled with fluid;

3. The cup-equipped piston bodies 33 are subject to relatively light yielding pressure of coiled springs 39 to move to their extreme positions in the direction of expansion chambers 26 but are normally maintained in their opposite extreme positions, shown in the drawings, by the retracting force of springs 18 working through the medium of their cup-equipped pistons 14 and a body of fluid entrapped between the pistons 14 and the cup-equipped floating valve bodies 33, due to the much greater force exerted by springs 18 than by springs 39;

4. The springs 39 work in direct opposition to the retracting springs 18, and, because the springs 39 are arranged to react directly on the pistons 15 and indirectly on the pistons 14 through the medium of the valve body heads, valve cups 34, and the fluid in expansion chambers 26, said springs 39 will at all times cause a somewhat higher fluid pressure to be maintained in the chambers 26 than in chambers 27. This unequal pressure on opposite sides of the flanged valve cups 34 maintains the flanges of said cups 34 in tight sealing contact with the fixed sleeve 35 during the application cycle when the valve bodies and cups 34 are moved with the column of fluid from their inoperative positions shown to their opposite extreme positions and during which time the cups 34 would otherwise be floating with equal pressure on opposite sides thereof;

5. That the springs 18 are preferably of substantially equal strength; and

6. That it is assumed in the description of the operation to follow that the brake drum is being rotated in a counter-clockwise direction, as indicated by direction arrows thereon.

An object of the invention is to apply both brake shoes to the climax of braking efficiency in either direction of rotation, with the added safety feature of automatic adjustment. The following further comments in respect to the cylinder arrangement, it is thought, will make the operation more apparent and more readily understood.

When the column of brake fluid in the system is applied under various stages of pressure through the medium of suitable pressure-producing devices connected to the passages 31, the various stages of brake-fluid pressure will be effective on the cup-equipped pistons 15 and the cup-equipped measuring valve bodies 33 which form the ends of the application-expansion chambers 27. The ends of the automatic-adjusting chambers 26 are formed by the cup-equipped measuring-valve bodies 33 and the cup-equipped piston 14. It is obvious therefore that the automatic adjusting chambers 26 and the application-expansion chambers 27 are separated by the cup-equipped measuring valve bodies 33, and through this novel valve mechanism the automatic adjustment of the brake is made. The function of the application-expansion chambers 27 is to apply the brake while the function of the automatic-adjusting chambers 26 is to store the brake fluid that is automatically passed through the cup-equipped measuring-valve bodies 33 simultaneously on each application cycle, to compensate for the brake lining wear. A rotary brake drum of the usual character and which may be assumed to be mounted fast on a vehicle wheel, not shown, is indicated by 7, and a backing plate which serves to close the open side of the brake drum 7, and as a mounting base for the cylinders of the brake mechanism is indicated at 8.

Two brake cylinders, 12 and 13, identical in structure, are mounted directly opposite each other on a line indicating the diameter of the backing plate 8. In each of the cylinders, the elements, described under cylinder arrangement, are provided. The brake shoes 9 and 10 are each pivoted at one end to a flange-equipped piston 15, which serves as the anchors when engaged on the ends of the cylinders 12 and 13, for the high speeds in the forward direction. Each of the opposite ends of the brake shoes 9 and 10 engage a piston 14 and impart the anchor load in reverse on the internal-anchor flanges 24 in the cylinders 12 and 13 through the medium of the flange-equipped measuring valve bodies 33 and the brake fluid entrapped in the automatic-adjusting chambers 26. It is apparent that the heads 36 of the pressed-in cylinders 35 divide the automatic-adjusting chambers 26 into halves. This is a reason for confusion, and should be disregarded, as the heads 36 are provided with parts 37 of liberal capacity, which allow the brake fluid entrapped in the automatic-adjusting chambers 26 to pass freely from one side of the heads 36 to the other side during the periods of application and release cycles. It is obvious that the flange-equipped pistons 15 and the flange-equipped measuring valve bodies 33 are held directly or indirectly on their anchor positions in release by the retracting capacity of twenty-five pounds as provided by the springs 18 which are arranged across opposite ends of the brake shoes 9 and 10.

The springs 39 have a capacity of 20 pounds and are arranged on the flange-equipped pistons 15 and the cup-equipped measuring valve bodies 33 in direct opposition to the retracting capacity of the springs 18; by this arrangement the brake fluid in the automatic-adjusting chambers 26 will be 25 pounds, while the retracting pressure on the anchors is five pounds. It is the purpose of this arrangement to provide a local source of pressure in the automatic-adjusting chambers 26 when the brake is in the release position to prevent any tendency of escape of the entrapped brake fluid, and to insure a higher brake-fluid pressure in the automatic adjusting chambers 26 than the unit-brake fluid pressure supplied by the master cylinder to the application-expansion chamber 27 during the period of movement of the cup-equipped measuring valve bodies 33 from their retracted positions in release to their positions of application where the flanges 38 of the cup-equipped measuring valve bodies 33 will engage the ends of the pressed-in cylinders 35. In this position, the movement of the measuring valve bodies 33 is stopped and the cups 34 are engaged on the hub-like heads 36 of the pressed-in cylinders 35. When the unit-brake fluid pressure in the application-expansion chambers 27 exceeds the brake fluid pressure in the automatic-adjusting chambers 26, the unit-brake fluid pressure will pass through the ports 33a, provided in the ends of the measuring-valve bodies 33, and press the edges of the cups 34 away from the walls of the pressed-in cylinders 35, and thereby have free passage to act directly on the cup-equipped pistons 14. It is obvious that by this arrangement, any movement of the cup-equipped piston 14 beyond the application engagement of the frictional surfaces will be the result of brake-lining wear and the unit-brake-fluid pressure will enter the automatic adjusting chambers 26 in such limited quantities as is necessary to compensate for wear of the frictional surfaces.

When the unit pressure in the application-expansion chambers 27 is released, the springs 18 will retract the brake shoes 9 and 10 away from the brake drum 7 to the limits of clearance provided between the flanges 38 of the cup-equipped measuring valve bodies 33 and the internal anchor flanges 24.

*Operation*

That, whereas no brake fluid is indicated in the system, the parts are positioned as if, and it should be assumed that the system were filled with brake fluid, but that no brake-actuating pressure was being applied to the fluid. That the brake shoe retracting springs 18 are somewhat heavier and stronger than the springs 39 which are arranged in direct opposition to the springs 18. For convenience let 25 pounds represent the retracting capacity of the springs 18, and the opposing springs 29, which are set in compression represent 20 pounds; this condition provide five pounds as the difference and represent the pressure imposed on the anchors, while 25 pounds is the pressure on the brake fluid in the automatic adjusting chambers 26, it is therefore necessary to increase the unit-brake fluid pressure in the application expansion chambers 26 but six pounds in order to move the measuring-valve bodies 33 from the release positions to the positions of applications; this provides nineteen pounds more pressure in the automatic adjusting chambers 26 than is applied in ten application expansion chambers 27 and will prevent the unit brake fluid pressure of six pounds from entering the automatic adjusting chambers 26 where the brake fluid pressure is nineteen pounds higher even though the cups 34 are arranged opposite to their natural sealing conditions.

When additional fluid from a suitable source, such as a master cylinder and piston, is introduced under pressure to the expansion chambers 27, the pressure of fluid in expansion chambers 27 will be raised and the pressure in expansion chambers 26 will be raised to an equal extent by virtue of the fact that measuring valve mechanism 25, interposed between chambers 26 and 27, is a one-way operating mechanism and offers no appreciable resistance to movement of fluid in the direction of expansion chambers 26. Under this increased fluid pressure in the expansion chambers 27 and 26, the pistons 14 and 15 will move simultaneously outwardly until their respective co-operating ends of shoes 9 or 10 come into engagement with the brake drum 7. Under outward projecting movements of pistons 15, the valve bodies 33 move with the column of fluid, such action being aided by springs 39, until they reach their extreme positions in the direction of expansion chambers 26 and then, if the affected toe ends of shoes 9 have not come into firm contact with the drum, fluid will by-pass around the valve cups 34 and move into the chambers 26 until the toe ends of the shoes 9 and 10 are stopped by the drum and the pressure in the system is again equalized. The amount of fluid thus by-passed around the valve cups 34 from chambers 27 to chambers 26 will be just enough to compensate for wear on the friction surfaces of the shoes during the preceding braking operation, and hence, will be minute, almost unmeasurable, quantities.

It is during the above noted brake setting period, known as the application cycle, that the springs 39 come into play to produce an unequal pressure in chambers 26 and 27 and to thereby insure instant response of the valve cups 34 to pistons 14, within the limits of movement permitted. These springs 39 may not be necessary in cases where the flanged valve cups 34 exert a considerable outward pressure on the fixed sleeves 33 but are preferably incorporated as safeguards against adverse movements of the valve cups.

When the facings 11 of the shoes 9 and 10 are moved into frictional engagement with the drum 7, the frictional load picked up by the shoes will tend to rotate the shoes in the direction of rotation of the drum which, for the purpose of the present example, is assumed to be in a counter-clockwise direction. This frictional load picked up by the shoes 9 and 10 will be applied through the pistons 15 to the fluid in the expansion chambers 27, thereby raising the pressure in expansion chambers 27 above that existing in other portions of the fluid system, and as a result of this unequal pressure, fluid in the expansion chambers 27 will be expelled therefrom into the supply connections to the extent necessary to permit pistons 15 to recede back to their normal inoperative positions shown in the drawings, wherein the piston flanges 20 are in engagement with the ends of the cylinders. The piston-equipped heel ends of the shoes 9 and 10 having now been returned to the definite predetermined positions, become effectively anchored and the application cycle is now complete and the effective braking cycle started. It will now be seen that, the frictional load applied to the shoes now being carried by the flanges 20 of the pistons 15, the pressure in chambers 26 and 27 will again be equal except for the relatively small difference created by the springs 39 in favor of the chambers 26. Under these conditions the chambers 26 and 27 operate substantially as a common chamber, the fluid column in said chambers reacting at one end against the pistons 15, which function now as fixed bases of reaction and said fluid, and exerting braking action on the toe ends of the shoes 9 and 10 through the medium of the cup-equipped pistons 14.

It will be evident that the arrangement described operating under the conditions described, the shoes 9 and 10 will be equally effective due to the fact that the heel end of each thereof is anchored and brake-setting pressure is applied to the toe end of each thereof, and for this reason also the efficiency of each shoe will be very high since the frictional load picked up by each of the shoes will be in a direction effective to aid in setting the brakes.

When the fluid system is relieved of brake-setting pressure, the toe ends of the shoes 9 and 10, to wit: the right-hand end of shoe 9 and the left-hand end of shoe 10, will be returned to indefinite positions a predetermined definite distance from the drums by the springs 18 and the heel ends of the shoes 9 and 10, having been returned to their normal positions during the brake-setting period, will remain as during the effective braking period.

The action responsible for the above noted measured retraction of the toe ends of the shoes 9 and 10 is as follows: Immediately upon release of the brake-setting pressure on the fluid system, the fluid in expansion chambers 26, being subject to pressure exerted by springs 18 through the pistons 14 and being now above that pressure existing in chambers 27 and the other portions of the fluid system, will move inwardly as a body to the extent permitted by maximum possible return movements of the valve cups 34 and bodies 33, that is, until the flanges 38 of the valve bodies engage the flanges 23 of the cylinders. These bodily retracting movements of the cup-equipped pistons 14, the entire body of fluid in the chambers 26, and the cup-equipped valve bodies 33, does, of course, cause displacement of fluid from the chambers 27 into the supply connections and the volume of fluid discharged from each chamber 27 is a carefully measured predetermined amount calculated to be just sufficient to permit retraction of the toe ends of the shoes 9 and 10 to positions of minimum tolerable clearance from the drum.

It will be seen that, since the valve cups 34 permit flow of fluid there-past in only one direction, each time the brake is set sufficient additional fluid will be passed thereby into the expansion chambers 26 to compensate for wear on the friction surfaces of the brake shoes 9 and 10 during the previous braking period and, therefore, subsequent to each braking period, the toe ends of the shoes will be automatically located in indefinite positions that are always the same predetermined distance from the drum, regardless of the condition of wear of the friction surfaces.

This frequent readjustment of the toe ends of each of the shoes so that they are normally maintained in the same close spaced relation to the drum regardless of the conditions of wear of the friction surfaces, permits setting of the brake shoes with the same degree of movement at the point of application of pressure each time the brake is set, without regard to the condition of the friction surfaces and without requiring any manual adjustment.

It will be seen that when the vehicle is operated in reverse and the brake drum rotated in a clockwise direction, in respect to the drawings, that the ends of the shoes that were previously referred to as the toe ends will become the heel ends of the shoes, and that the ends of the shoes that were previously referred to as the heel ends of the shoes, will become the toe ends of the shoes.

In this case, the frictional load picked up by the shoes, being in a clockwise direction, will cause the pistons 14, which are connected to the now heel-acting ends of the shoes, to recede to their normal positions or to the extent permitted by engagement of the flanges 38 of the valve bodies 33 with the cylinder flanges 23, after which the fluid entrapped in the expansion chambers 26 will serve to hold the pistons 14 and the connected heel ends of the shoes 9 and 10 positively anchored during the balance of the braking period. Of course, the point of anchorage of the heel ends of the shoes in this case will be indefinite but a definite predetermined distance from the drum, and the application of braking pressure to the shoes 9 and 10 will be applied through the pistons 15 to the now acting toe ends of the shoes.

The main distinction between the function of the brake under clockwise rotation of the drum as compared to operation thereof under counter-clockwise direction of the drum is that in the first instance the heels of the shoes are anchored always in the same predetermined spaced relation to the drum regardless of wear of the friction surfaces, both during the braking period and while inoperative, whereas under counter-clockwise rotation of the drum, it is the toe ends of the shoes that are automatically adjusted to desired spaced relation from the drum during inoperative periods, and the heels are not subject to automatic adjustment. When the brake shoes function as under clockwise rotation of the drum which, as described, is the direction of rotation under reverse movements of the vehicle, the frictional load applied to the shoes is taken through the cups 16 of pistons 14, the cups 34 of the valve bodies, and the interposed entrapped fluid which subjects the said cups to comparatively great strain, but with the arrangement described, this strain will not be unduly great since vehicles never travel at great speeds in a reverse or backing up direction.

What I claim is:

1. In a friction brake mechanism, the combination with a rotary brake drum and a plurality of non-rotary segmental brake shoes disposed in circumferentially spaced relation adjacent the drum, of yielding means tending to retract both ends of each shoe out of engagement with the drum, means for moving opposite ends of each shoe into frictional engagement with the drum to set the brake, means for limiting retracting movements of one like end portion of each shoe, with respect to one direction of drum rotation, to a definite predetermined position irrespective of wear on the friction surfaces, and automatically adjustable means for limiting retracting movements of the other end of each shoe to positions determined by the stage of wear of the friction surfaces and wherein the drum-engaging friction portion of that end of each shoe is spaced a definite predetermined distance from the drum.

2. In a fluid pressure operated friction brake mechanism, the combination with a rotary brake drum, a plurality of segmental brake shoes disposed in circumferentially spaced relation adjacent the drum, yielding means tending to retract both ends of each shoe out of engagement with the drum, and fluid pressure operated means for moving opposite ends of each shoe into frictional engagement with the drum to set the brake, of means for limiting retracting movements of one like end of each shoe, with respect to a direction of drum rotation, to a definite predetermined position irrespective of the stage of wear of the friction surfaces, and automatic means subject to the action of said fluid pressure operated brake-setting means and automatically adjusted thereby to limit retracting movements of the other end of each shoe to a position determined by the condition of the friction surfaces and in which position the drum-engaging friction portion of that end of each shoe is spaced a definite predetermined distance from the drum.

3. In a fluid pressure operated brake mechanism, the combination with a rotary brake drum and a plurality of segmental brake shoes disposed adjacent the drum, of a fluid pressure projectable device for each end of each shoe, means for applying fluid pressure to the several fluid pressure projectable devices to move the shoes into frictional engagement with the drum, yielding means tending to retract opposite ends of said shoes, means for limiting retracting movements of one like end of each shoe, with respect to a direction of drum rotation, to a definite predetermined position, and automatic fluid pressure operated means for automatically limiting retracting movements of the other end of each shoe to positions a predetermined definite distance from the drum.

4. In a fluid pressure operated brake mechanism, the combination with a rotary brake drum and a plurality of segmental brake shoes disposed adjacent the drum, of a fluid pressure projectable device for each end of each shoe, means for applying fluid pressure to the several fluid pressure projectable devices to move the shoes into frictional engagement with the drum, yielding means tending to retract opposite ends of said shoes, of mechanical stop means for positively limiting retracting movements of one like end of each shoe, with respect to a direction of drum rotation, to a definite predetermined position, and automatic fluid pressure operated means for automatically limiting retracting movements of the other end of each shoe to positions a predetermined definite distance from the drum.

5. In a fluid pressure operated friction brake mechanism, the combination with a rotary brake drum, a plurality of segmented brake shoes normally positioned in close spaced relation to the brake drum, fluid pressure operated means for moving opposite ends of each shoe into engagement with the brake drum and including an independent fluid pressure projectable device and associated fluid expansion chamber for each end of each brake shoe, a source of fluid pressure connected in common to the several expansion chambers, yielding means for maintaining the shoes under tension to retract them away from the drum, mechanical means independent of the fluid system for limiting retracting movements of one like end, with respect to a direction of drum rotation, of each shoe, and automatic valve means interposed in the fluid connection between each of the expansion chambers associated with a like other end of each shoe and the source of fluid pressure for measuring the quantity of fluid released from said expansion chambers and checking the return flow of fluid therefrom after a predetermined measured quantity thereof has been exhausted from the same.

6. The structure defined in claim 5 in which the said valve means permits free flow of fluid into the associated expansion chambers.

ROY CORWIN HOYT.